(12) United States Patent
Takaoka

(10) Patent No.: US 8,103,450 B2
(45) Date of Patent: Jan. 24, 2012

(54) NAVIGATION APPARATUS AND NAVIGATION PROCESSING METHOD

(75) Inventor: Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1182 days.

(21) Appl. No.: 11/846,789

(22) Filed: Aug. 29, 2007

(65) Prior Publication Data

US 2008/0071475 A1     Mar. 20, 2008

(30) Foreign Application Priority Data

Aug. 31, 2006  (JP) ................ P2006-236487

(51) Int. Cl.
*G01C 21/00*     (2006.01)
(52) U.S. Cl. ......... 701/214; 701/200; 701/216; 701/220
(58) Field of Classification Search .......... None
See application file for complete search history.

(56) References Cited

U.S. PATENT DOCUMENTS

2006/0265127 A1   11/2006   Qu

FOREIGN PATENT DOCUMENTS

| CN | 1235017 | 1/2006 |
|---|---|---|
| JP | 06-088733 | 3/1994 |
| JP | 08-327378 | 12/1996 |
| JP | 10-002746 | 1/1998 |
| JP | 10-038592 | 2/1998 |
| JP | 3497329 | 11/2003 |
| JP | 2004-138553 | 5/2004 |
| JP | 2006-138835 | 6/2006 |

OTHER PUBLICATIONS

Notification of First Office Action dated Mar. 29, 2010, from The State Intellectual Property Office of P.R. China.

*Primary Examiner* — Khoi Tran
*Assistant Examiner* — Bhavesh V Amin
(74) *Attorney, Agent, or Firm* — Finnegan, Henderson, Farabow, Garrett & Dunner, L.L.P.

(57) ABSTRACT

A navigation apparatus includes: a section that calculates, in accordance with a predetermined calculation method, a current speed of a mobile object at predetermined intervals, based on the mobile object's initial speed detected at the start of the calculation; a section that calculates a travel distance the mobile object has traveled so far since the start of the calculation; a section that calculates, based on the calculation method, a current speed error range of the current speed by using an initial speed error range of the initial speed; a section that calculates a travel distance error range of the travel distance by using the current speed error range; a section that evaluates, based on the travel distance error range, the reliability of the travel distance; and a section that performs a navigation process corresponding to the reliability of the travel distance.

12 Claims, 9 Drawing Sheets

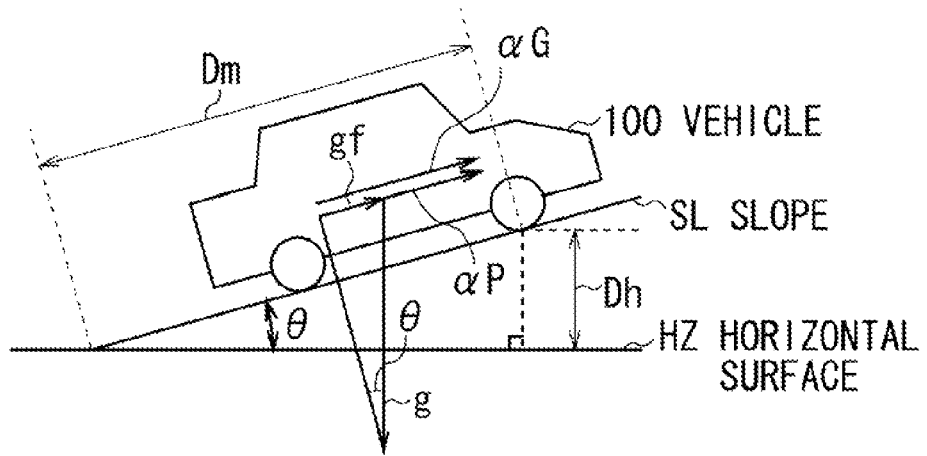
FIG.2A
FIG.2B
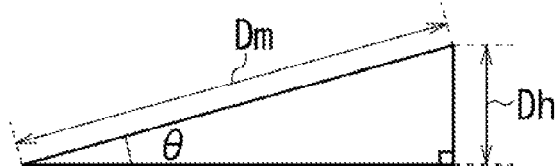
FIG.2C
FIG.2

FIG.3A HORIZONTAL SURFACE

FIG.3B ASCENDING SLOPE

FIG.3C DESCENDING SLOPE

FIG. 4A  HORIZONTAL SURFACE

FIG. 4B  ASCENDING SLOPE

FIG. 4C  DESCENDING SLOPE

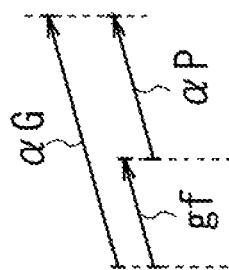 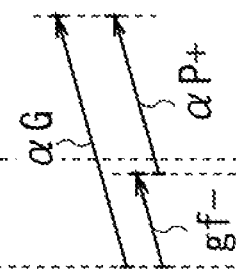 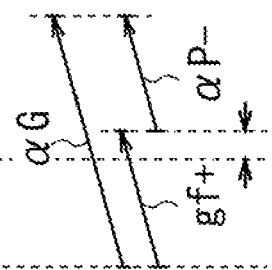
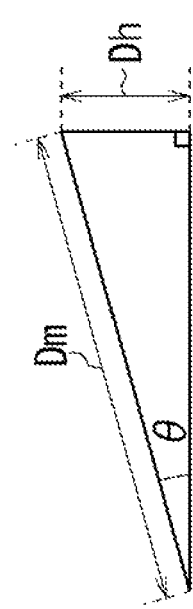
FIG.5A
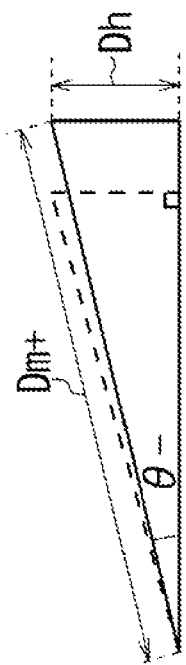
FIG.5B
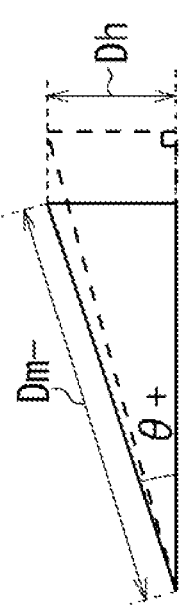
FIG.5C
FIG.5

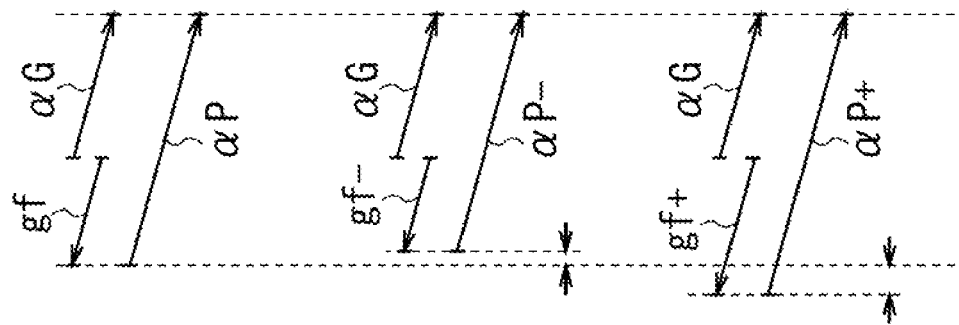
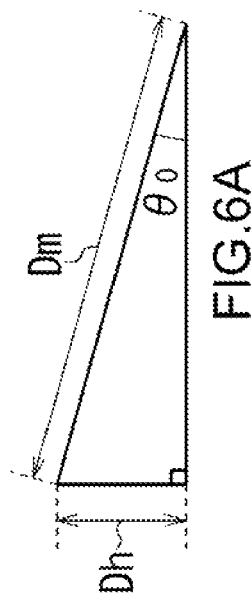
FIG.6A
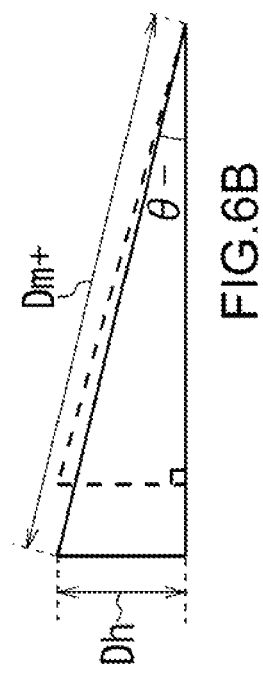
FIG.6B
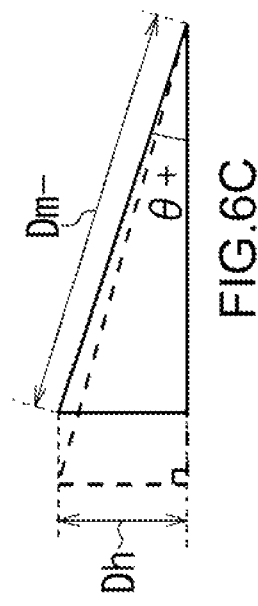
FIG.6C
FIG.6

NAVIGATION APPARATUS AND NAVIGATION PROCESSING METHOD

CROSS REFERENCES TO RELATED APPLICATIONS

The present invention contains subject matter related to Japanese Patent Application JP2006-236487 filed in the Japanese Patent Office on Aug. 31, 2006, the entire contents of which being incorporated herein by reference.

BACKGROUND OF THE INVENTION

1. Field of the Invention

The present invention relates to a navigation apparatus and navigation processing method, and is preferably applied to a navigation apparatus mounted on a vehicle, for example.

2. Description of Related Art

Generally, a navigation apparatus to be mounted on a vehicle and the like is here to stay. The navigation apparatus calculates the current position of the vehicle based on a GPS signal from a Global Positioning System (GPS) satellite. The navigation apparatus displays on a display section a map with information such as the current location and speed.

In addition, there is a portable navigation apparatus that can be taken out of the vehicle to use it in a different vehicle. This also prevents theft while the vehicle is parked. This type of navigation apparatus is not directly connected to the electronic circuits of the vehicle even when it is inside the vehicle. Accordingly, while unable to receive the GPS signals due to the vehicle running inside a tunnel or behind building, the navigation apparatus may not be able to calculate the vehicle's speed from a vehicle's speed pulse supplied from the vehicle.

On the other hand, there is a navigation apparatus that calculates the vehicle's current location, travel distance and the like even when not receiving the GPS signals: The navigation apparatus autonomously estimates, based on the vehicle's speed calculated from the GPS signals (This calculated speed is also referred to as "GPS velocity"), the vehicle's speed and then calculates the vehicle's current location, travel distance and the like based on the estimated speed (This estimated speed is also referred to as "autonomic speed"). In this manner, the navigation apparatus autonomously estimates the vehicle's speed even when not receiving information from the outside.

However, the GPS velocity calculated by the navigation apparatus is not always accurate, including a certain degree of error when the GPS signals are not received appropriately. On the other hand, when receiving the GPS signals, the navigation apparatus calculates the current position of the vehicle from the GPS signals, not from the GPS velocity. In this case, the calculated current position is substantially accurate because it is not affected by errors of the GPS velocity.

However, when not receiving the GPS signals, the navigation apparatus autonomously estimates the vehicle's speed as the autonomic speed, based on the GPS velocity. In addition, the navigation apparatus calculates, based on the estimated autonomic speed, the vehicle's travel distance or a distance the vehicle has traveled so far while not receiving the GPS signals. The navigation apparatus subsequently estimates the vehicle's current position based on the calculated travel distance. In this case, the estimation of the current position may be affected by the errors of the GPS velocity.

That is, the autonomic speed estimated by the navigation apparatus may be less accurate if the GPS velocity includes errors. The vehicle's travel distance calculated from the autonomic speed may become less accurate accordingly. The travel distance becomes less accurate as time advances because it is affected by the errors of the autonomic speed. Accordingly, the estimation of the vehicle's current position becomes less accurate as time advances. In this manner, the estimated current position (also referred to as "autonomic position") becomes less accurate as time advances.

By the way, as disclosed in Patent Document 1 (Jpn. Pat. Laid-open Publication No. H10-38592), there is a navigation apparatus that stops displaying the autonomic position after a predetermined period of time has passed since the start of the autonomic speed calculation.

SUMMARY OF THE INVENTION

However, that type of navigation apparatus is designed to stop displaying the autonomic position even when the error of the autonomic position is small. Accordingly, in order to continue to display the autonomic position for a long time, the navigation apparatus has no choice but to display unreliable autonomic positions.

The present invention has been made in view of the above points and is intended to provide a navigation apparatus and navigation processing method that can provide reliable position information.

In one aspect of the present invention, a navigation apparatus includes: a speed calculation section that calculates, in accordance with a predetermined calculation method, a current speed of a mobile object at predetermined intervals, based on the mobile object's initial speed detected at the start of the calculation; a travel distance calculation section that calculates a travel distance the mobile object has traveled so far since the start of the calculation, by using the current speed; a current speed error range calculation section that calculates, based on the calculation method, a current speed error range of the current speed by using an initial speed error range of the initial speed; a distance error range calculation section that calculates a travel distance error range of the travel distance by using the current speed error range; a reliability evaluation section that evaluates, based on the travel distance error range, the reliability of the travel distance; and a control section that performs a navigation process corresponding to the reliability of the travel distance.

Accordingly, the navigation apparatus can precisely calculate, as the current speed error range, the error of the current speed that may arise from the error of the initial speed. Therefore, the navigation apparatus can check the reliability based on the travel distance error range calculated from the current speed error range, and then perform an appropriate process as a result of checking.

In that manner, the navigation apparatus can precisely calculate, as the current speed error range, the error of the current speed that may arise from the error of the initial speed. Therefore, the navigation apparatus can check the reliability based on the travel distance error range calculated from the current speed error range, and then perform an appropriate process as a result of checking. Thus, the navigation apparatus and navigation processing method according to an embodiment of the present invention can provide reliable position information.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2C are schematic diagrams illustrating calculation of speed;

FIGS. 5A to 5C are schematic diagrams illustrating the error of speed arising from an ascending slope;

FIGS. 6A to 6C are schematic diagrams illustrating the error of speed arising from a descending slope;

DETAILED DESCRIPTION OF PREFERRED EMBODIMENTS

An embodiment of the present invention will be described in detail with reference to the accompanying drawings.

(1) Overall Configuration (1-1) Configuration of a Navigation Apparatus

Figure 1:
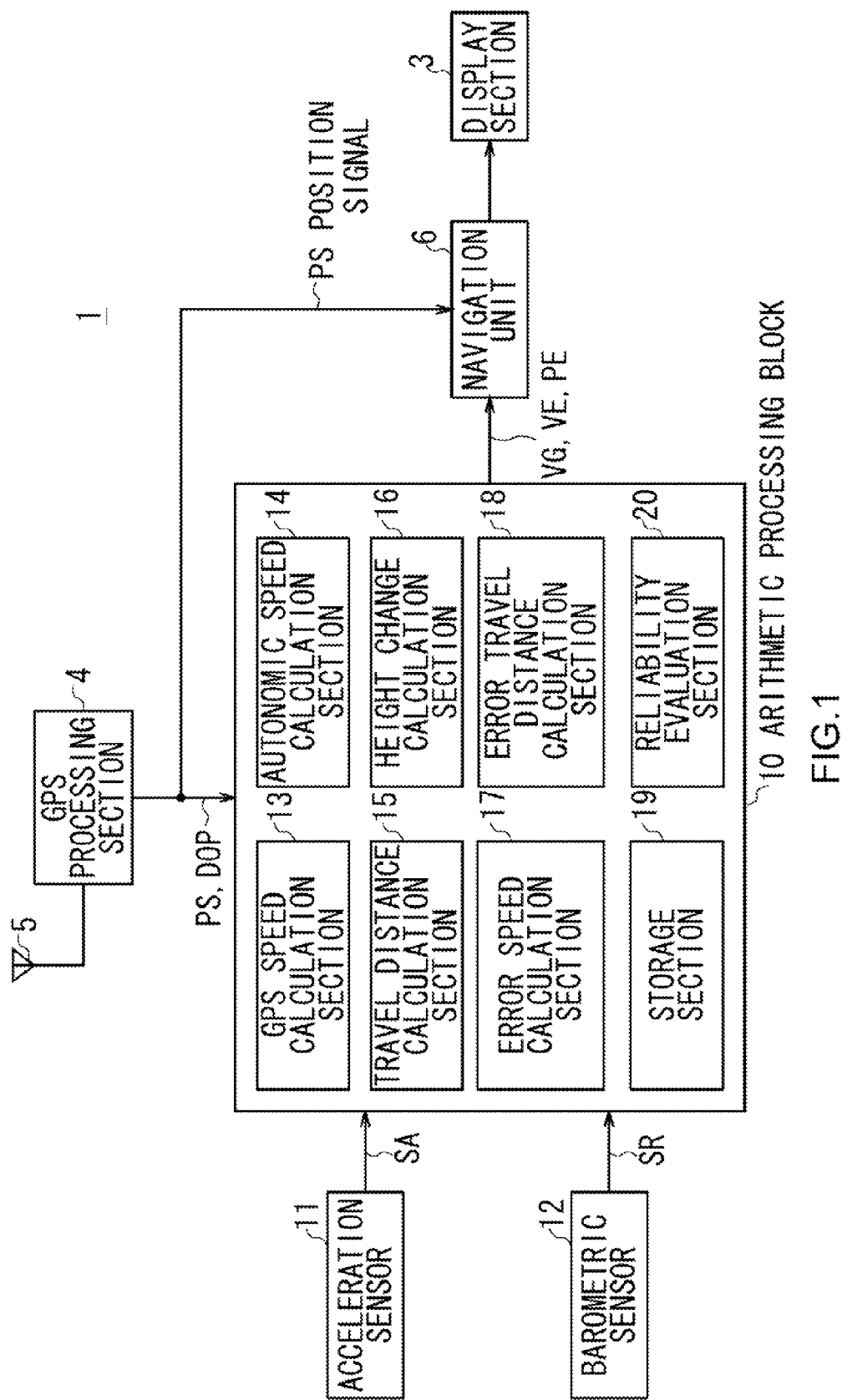
FIG. 1 is a schematic diagram illustrating the circuit configuration of a navigation apparatus according to an embodiment of the present invention.

In FIG. 1, the reference numeral 1 represents a navigation apparatus 1 that is mounted on a vehicle 100 (equivalent to a mobile object). When able to receive the Global Positioning System (GPS) signals from the GPS satellite, the navigation apparatus 1 receives the GPS signals through a GPS antenna 5 and then supplies the received GPS signals to a GPS processing section 4.

The GPS processing section 4 performs a predetermined position calculation process based on the GPS signals to calculate the current position of the vehicle 100 and then supplies a resulting position signal SP to a navigation unit 6 and an arithmetic processing block 10 (the current position calculated based on the GPS signals is also referred to as "GPS position").

The arithmetic processing block 10 includes a Central Processing Unit (CPU) (not shown) that reads out from a Read Only Memory (ROM) (not shown) various programs, such as a reliability evaluation program, to perform various processes.

The arithmetic processing block 10 receives from the GPS processing section 4 the position signal PS and a Dilution of Precision (DOP) value (described later) during a predetermined input period. Based on the position signal PS, a GPS speed calculation section 13 of the arithmetic processing block 10 calculates the distance traveled per unit of time as the GPS velocity VG of the vehicle 100. A storage section 19 (such as nonvolatile memories) stores the GPS velocity data VG and the DOP value. The GPS velocity data VG is also supplied to the navigation unit 6.

Based on the supplied position signal PS and GPS velocity data VG, the navigation unit 6 generates display screen data including a map on which a mark indicating the GPS position of the vehicle 100 and the GPS velocity VG are displayed. The navigation unit 6 supplies the display screen data to a display section 3, which then displays the map with the mark. In this manner, when receiving the GPS signals, the navigation apparatus 1 displays the GPS speed VG and the GPS position as the speed and current position of the vehicle 100 in order for a user to recognize them.

The navigation apparatus 1 does not use a vehicle's speed pulse signal generated in the vehicle 100: The vehicle's speed pulse signal is a pulse-like signal whose interval changes according to the speed of the vehicle 100. As a result, the navigation apparatus 1 is connected to the vehicle 100 with fewer cables.

When not receiving the GPS signals, the navigation apparatus 1 operates in an autonomic mode in which the navigation apparatus 1 autonomously calculates the speed and current position of the vehicle without receiving any information from the outside.

The arithmetic processing block 10 is connected to an acceleration sensor 11 and a barometric sensor 12. The acceleration sensor 11 generates an acceleration detection signal SA whose voltage changes according to the acceleration of the vehicle 100 in the direction of the motion of the vehicle 100. The acceleration sensor 11 supplies the acceleration detection signal SA to the arithmetic processing block 10. The barometric sensor 12 generates an atmospheric pressure detection signal SR whose voltage changes, in accordance with the atmospheric pressure around it, within a predetermined range. The barometric sensor 12 supplies the atmospheric pressure detection signal SR to the arithmetic processing block 10.

If the position signal PS is not supplied from the GPS processing section 4 during a predetermined period of time (also referred to as an "input period"), an autonomic speed calculation section 14 of the arithmetic processing block 10 regards the acceleration detection signal SA supplied from the acceleration sensor 11 as a detection acceleration αG that represents the vehicle's acceleration in the direction of the vehicle's motion. In addition, the autonomic speed calculation section 14 regards the atmospheric pressure detection signal SR supplied from the barometric sensor 12 as an atmospheric pressure value PR that represents the atmospheric pressure around it.

Moreover, the autonomic speed calculation section 14 receives from the storage section 19 the latest GPS velocity data VG which was detected when the apparatus was receiving the GPS signals, and then calculates, based on the detection acceleration αG and the atmospheric pressure value PR, the speed of the vehicle 100 as an autonomic speed VE (described later).

A travel distance calculation section 15 of the arithmetic processing block 10 calculates, based on the autonomic speed VE, an amount of the motion of the vehicle 100 and then, while the apparatus is not receiving the GPS signals, adds it up to calculate a travel distance DT. Based on the travel distance DT, the travel distance calculation section 15 calculates the current position of the vehicle 100 as the autonomic position and then generates an autonomic position signal PE. The travel distance calculation section 15 supplies the autonomic position signal PE to the navigation unit 6 along with the autonomic speed data VE.

Based on the supplied autonomic position signal PE and autonomic speed data VE, the navigation unit 6 generates display screen data including a map on which a mark indicating the autonomic position of the vehicle 100 and the autonomic speed VE are displayed. The navigation unit 6 supplies the display screen data to the display section 3, which then displays the map with the mark.

In that manner, even when not receiving the GPS signals, the navigation apparatus 1 displays the autonomic speed and the autonomic position as the current speed and position of the vehicle 100 in order for a user to recognize them.

(1-2) Calculation of Autonomic Speed
(1-2-1) Principle

Following describes how to calculate the autonomic speed VE when the apparatus is not receiving the GPS signals.

In this case, the autonomic speed VE is calculated at certain intervals (for example 1 second). The speed at a time instant t0 is represented as V0 while the current speed, or a speed at time instant t1, is represented as V1. The speed V1 is calculated as the autonomic speed VE. As for the speed V0, the first one, calculated immediately after the apparatus is disconnected from the GPS system, is regarded as an initial speed Va while the last one (or the GPS speed VG), calculated immediately before the apparatus is disconnected from the GPS system, is regarded as the last GPS speed VGa. Hereinafter, if the apparatus continuously calculates the autonomic speed VE even when not receiving the GPS signals, the previously-calculated autonomic speed VE is regarded as the speed V0.

As shown in FIG. 2A, suppose that the vehicle 100 is running on an incline SL making an angle θ with respect to a horizontal plane HZ. In this case, the detection acceleration αG detected by the acceleration sensor 11 (FIG. 1) is equivalent to the combination of the actual acceleration of the moving vehicle 100 (also referred to as a "vehicle acceleration αP") and the component of gravity acceleration g in the direction of the vehicle's motion (also referred to as a "gravity acceleration component gf").

Accordingly, the vehicle acceleration αP is calculated by subtracting the gravity acceleration component gf from the detection acceleration αG in the following manner:

$$\alpha P = \alpha G - gf \qquad (1)$$

In FIGS. 2B and 2C, a distance Dm represents how far the vehicle 100 has moved on the incline SL during a period of time mt (for example 1 second) from t0 to t1. A height change Dh of the vehicle 100 represents how much the vehicle 100 has climbed during the period of time mt (also referred to as a "measurement period mt"). The ratio of the distance Dm and the height change Dh, represented as sin θ, is equivalent to the ratio of the gravity acceleration component gf and the gravity acceleration g. Accordingly, the following equation is defined:

$$\frac{gf}{g} = \frac{Dh}{Dm} = \sin\theta \qquad (2)$$

By the way, according to the general formulas using the speed and acceleration with distances, using the speed V0 of the vehicle 100 at the time instant t0 and the vehicle acceleration αP, the above distance Dm is expressed as follows:

$$Dm = V0 \cdot mt + \frac{1}{2}\alpha P \cdot mt^2 \qquad (3)$$

After transforming the equation (2), the substitution of the equations (1) and (2) presents αP in the following manner:

$$\frac{\alpha P - \alpha G}{g} \cdot \left(V0 \cdot mt + \frac{1}{2}\alpha P \cdot mt^2\right) = Dh \qquad (4)$$

(1-2-2) Calculation of Speed

When the navigation apparatus 1 (FIG. 1) is unable to receive the GPS signals through the GPS antenna 5 from the GPS satellite due to the vehicle running behind building or inside a tunnel, the navigation unit 6 may not be able to calculate the current position of the vehicle 100 from the position signal PS supplied from the GPS processing section 4. The navigation apparatus 1 therefore estimates the current position as the autonomic position, based on the autonomic speed VE of the vehicle 100. The navigation apparatus 1 subsequently displays it on a map being displayed on the display section 3.

However, the arithmetic processing block 10 (FIG. 1) of the navigation apparatus 1 may not be able to receive the GPS signal through the GPS antenna 5. Accordingly, the arithmetic processing block 10 may not be able to calculate the autonomic speed VE based on the change of the position signal PS supplied from the GPS processing section 4.

Accordingly, without using the position signal PS, the autonomic speed calculation section 14 of the arithmetic processing block 10 calculates the speed V1 at the time instant t1 based on the speed V0 at the time instant t0 and then regards the calculated speed V1 as the autonomic speed VE. This will be described in detail below.

Classifying the above equation (4) for the vehicle acceleration αP presents:

$$\alpha P = \frac{\alpha G}{2} - \frac{V0}{mt} + \sqrt{\left(\frac{\alpha G}{2} + \frac{V0}{mt}\right)^2 - \frac{2Dh \cdot g}{mt^2}} \qquad (5)$$

According to the general physics formulas regarding speed, the speed V1 at the time instant t1 is represented as follows:

$$V1 = V0 + \alpha P \cdot mt \qquad (6)$$

That means the speed V1 is calculated based on the speed V0.

The substitution of the equation (5) into the equation (6) presents:

$$V1 = \frac{\alpha G \cdot mt}{2} + \sqrt{\left(\frac{\alpha G \cdot mt}{2} + V0\right)^2 - 2Dh \cdot g} \qquad (7)$$

That means that, if the height change Dh is obtained, the arithmetic processing block 10 can calculate the speed V1 (or the autonomic speed VE) at the time instant t1 based on the detection acceleration αG, the measurement period mt, the speed V0 at the time instant t0, the gravity acceleration g and the height change Dh. In this case, the arithmetic processing block 10 eliminates the effect of the gravity acceleration component gf arising from the incline, which is included in the detection acceleration αG.

In that case, the arithmetic processing block 10 calculates the equation (7). However, the equation (7) was obtained after the substitution of the equation (5) into the equation (6). This means that the arithmetic processing block 10 indirectly calculates the vehicle acceleration αP and then obtains, based on the previous speed V0 at the time instant t0, the current speed V1 at the time instant t1 as the autonomic speed VE.

(1-2-3) Calculation of Height Change

A height change calculation section 16 (FIG. 1) of the arithmetic processing block 10 performs a calculation process of the height change Dh. This calculation process will be described below. As indicated in the above equation (2), the arithmetic processing block 10 calculates the height change Dh based on the distance Dm, the gravity acceleration component gf (i.e. the detection acceleration αG and the vehicle acceleration αP) and the gravity acceleration g.

If the GPS antenna 5 can receive the GPS signals, the travel distance calculation section 15 of the arithmetic processing block 10 can calculate the distance Dm or a distance the vehicle 100 has traveled during the measurement period mt. The travel distance calculation section 15 therefore calculates the autonomic speed VE based on the distance Dm and then calculates the vehicle acceleration αP based on the calculated autonomic speed VE.

Whereas if the GPS antenna 5 does not receive the GPS signals from the GPS satellites, the GSP processing section 4 may not be able to produce the position signal PS. Accordingly, the arithmetic processing block 10 may not be able to calculate the distance Dm and the vehicle acceleration αP. Also considering the equation (2), that means the arithmetic processing block 10 may not be able to calculate the height change Dh.

In this embodiment, based on the fact that the atmospheric pressure PR is associated with the altitude (or height) h, the arithmetic processing section 10 figures out the altitude h by recognizing the atmospheric pressure PR detected by the barometric sensor 12, when the position signal PS is not generated by the GPS processing section 4.

In reality, the arithmetic processing block 10 stores in the storage section 19 an atmospheric pressure/altitude table TBL in which the values of atmospheric pressure are associated with the corresponding values of altitude. For example, when the atmospheric pressure values PR0 and PR1 are respectively detected at the time instant t0 and t1, the height change calculation section 16 of the arithmetic processing block 10 reads out from the atmospheric pressure/altitude table TBL the height values h0 and h1, which are respectively associated with the atmospheric pressure values PR0 and PR1 in the table TBL.

The arithmetic processing block 10 subsequently calculates, as the height change Dh, a difference between the altitude value h0 of the vehicle 100 at the time instant t0 and the altitude value h1 of the vehicle 100 at the time instant t1:

$$Dh = h1 - h0 \quad (8)$$

Based on the calculated height change Dh, the arithmetic processing block 10 calculates the speed V1 at the time instant t1 by using the equation (7) with the above detection acceleration αG, the measurement period mt, the speed V0 at the time instant t0 and the gravity acceleration g. This allows the arithmetic processing block 10 to eliminate the effect of the gravity acceleration component gf arising from the incline in order to precisely calculate the speed V1 as the autonomic speed VE.

(2) Errors Arising from the Incline

As for the above method of speed calculation, the following describes a situation where the speed data V0, used at the time instant t0, includes an error.

In the autonomic speed calculation method illustrated with FIG. 2, as indicated in the equation (2), the angle θ of the incline is represented as sin θ based on the height change Dh and the distance Dm calculated from the speed V0. In addition, as indicated in the equation (1), the apparatus subtracts the gravity acceleration component gf, which corresponds to the angle θ of the inclination, from the detection acceleration αG. Moreover, as indicated in the equation (6), the speed V0, calculated previously at the time instant t0, is added to a speed change value ΔV (ΔV=αP×mt) or a value calculated by multiplying the current vehicle acceleration αP by the measurement time mt. As a result, the speed V1 (or the autonomic speed VE) at the time instant t1 is obtained.

According to that equation (7), if the initial speed Va, or the speed V0 to be used to start calculating the autonomic speed VE, includes an error, the apparatus may not be able to precisely calculate the distance DM, causing an error in the calculation in the angle θ of the incline.

Figure 3:
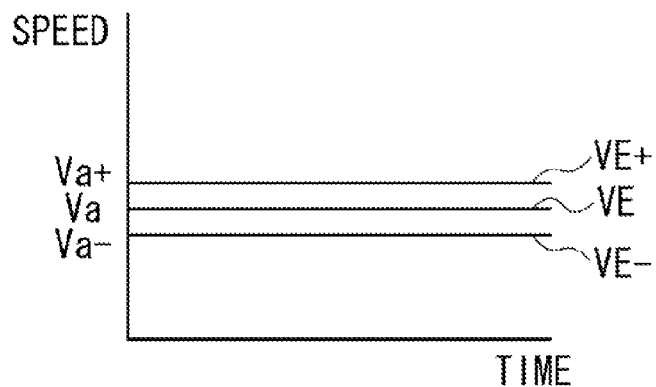
FIGS. 3A to 3C are schematic diagrams illustrating the error of speed which varies according to the angle of an incline.
Figure 3:
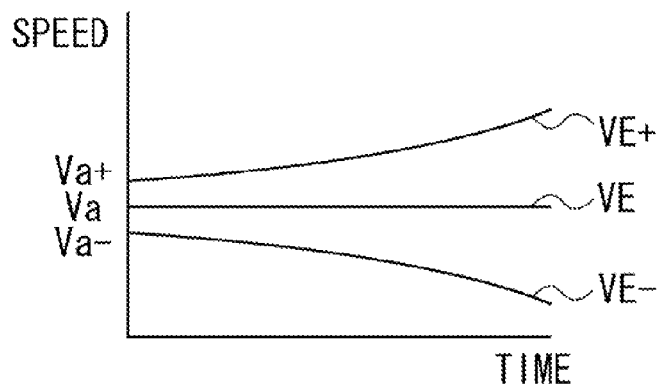
Figure 3:
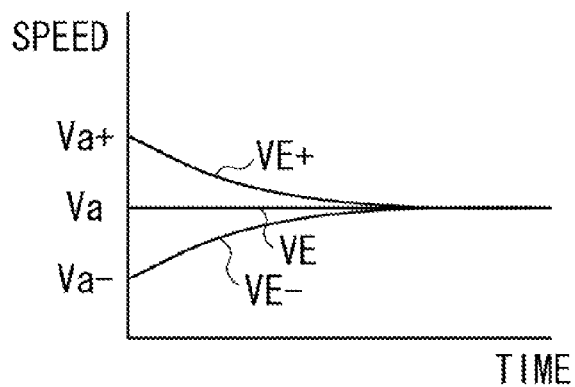

FIG. 3A illustrates the degree of error regarding the speed when the vehicle 100 is running on the horizontal surface at constant speed. "Va" means that the initial speed Va does not include any error and the autonomic speed "VE" is the result of this case. "Va+" and "Va−" mear that the initial speed Va includes the plus and minus errors and the autonomic speed "VE+" and "VE−" are the result of this case.

When the vehicle is running on the horizontal surface, the gravity acceleration component gf, associated with the angle θ of the incline, is always zero. This does not cause any new errors. The errors of the autonomic speed VE are kept at low levels. All the autonomic speed VE, VE+ and VE− are maintained at constant level.

Figure 4:
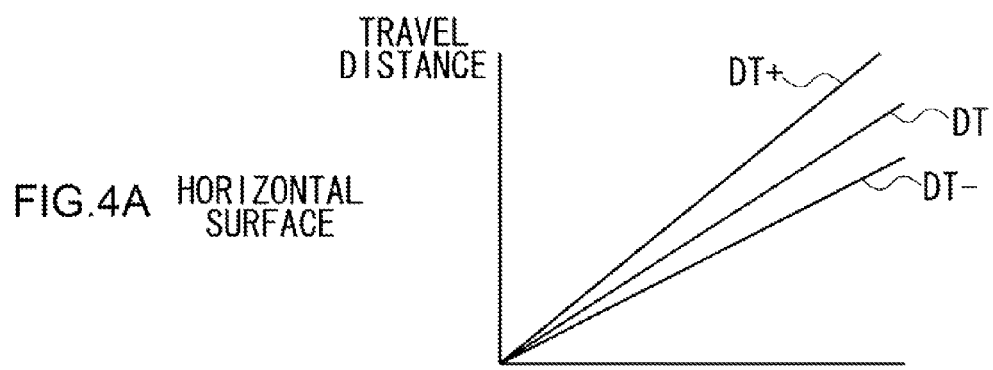
FIGS. 4A to 4C are schematic diagrams illustrating the error of travel distance which varies according to the angle of an incline.
Figure 4:
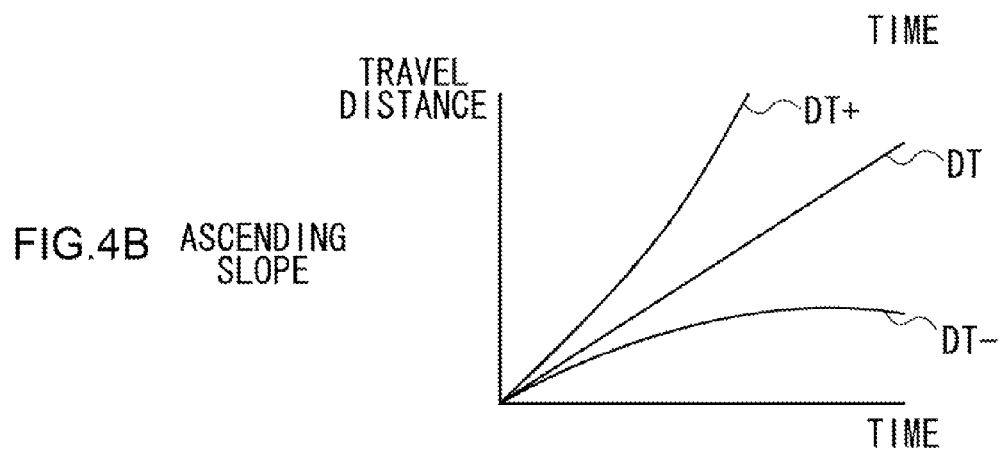
Figure 4:
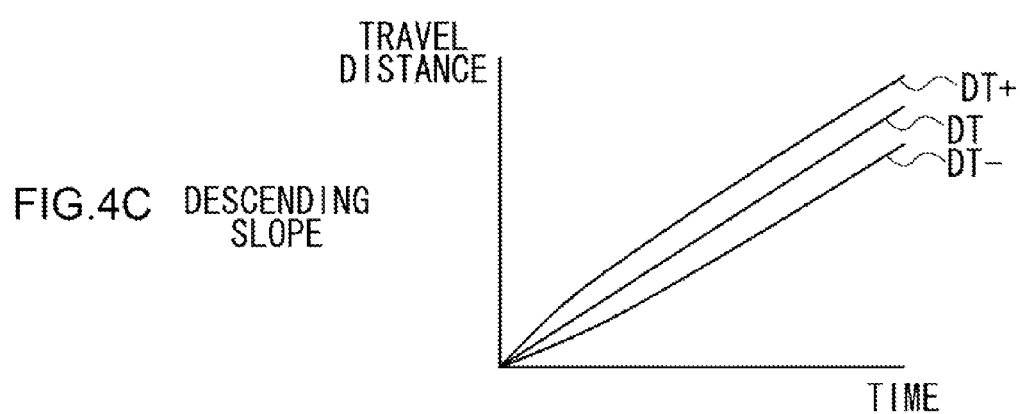

FIG. 4A shows the travel distance DT, DT+ and DT−, which are respectively calculated from the autonomic speed VE, VE+ and VE−. The travel distance DT, DT+ and DT− increase in proportion to the autonomic speed VE, VE+ and VE−. Accordingly, when the vehicle is running on the horizontal surface, both a difference between DT and DT+ and a difference between DT and DT− will increase as time advances.

On the other hand, in a case in which the angle of the ascending slope increases as the vehicle 100 moves on the road, as shown in FIG. 5A, the distance Dm is precisely calculated if the initial speed Va (or the speed V0) does not include an error. Accordingly, the gravity acceleration component gf, which corresponds to the precise angle θ of the incline, is subtracted from the detection acceleration αG. Accordingly, a value that is based on the vehicle acceleration αP calculated precisely in accordance with the equation (6), as the speed change value ΔV (ΔV=αP×mt) during the measurement time mt, is added to the precise speed V0. This presents the precise speed V1 or autonomic speed VE.

On the other hand, as shown in FIG. 5B, if the initial speed is "Va+" with plus error (i.e. faster than the speed V0), the distance Dm+ calculated from the initial speed Va+ becomes longer than the actual distance. Accordingly, the angle "θ−" of the incline becomes less steep than the actual angle θ. In addition, the calculated gravity acceleration component "gf−" becomes smaller than the actual gravity acceleration component gf.

Accordingly, subtracting the gravity acceleration component gf− from the detection acceleration αG presents the larger vehicle acceleration αP+ than usual. The larger vehicle acceleration αP+ contributes to the larger speed change value ΔV+, which is added to the larger initial speed Va+. As a result, the degree of error of the autonomic speed VE+ is multiplied compared to that of the initial speed Va+.

On the other hand, as shown in FIG. 5C, if the initial speed is "Va−" with minus error (i.e. slower than the speed V0), the distance Dm− calculated from the initial speed Va− becomes shorter than the actual distance. Accordingly, the angle "θ+" of the incline becomes steeper than the actual angle θ. In addition, the calculated gravity acceleration component "gf+" becomes larger than the actual gravity acceleration component gf.

Accordingly, subtracting the gravity acceleration component gf+ from the detection acceleration αG presents the smaller vehicle acceleration αP− than usual. The smaller vehicle acceleration αP− contributes to the smaller speed change value ΔV−, which is added to the smaller initial speed Va−. As a result, the degree of error of the autonomic speed VE− is multiplied compared to that of the initial speed Va−.

In addition, as shown in FIG. 3B, in a case in which the vehicle 100 is running on the ascending slope at the constant initial speed Va, the larger initial speed Va+ is added to the larger speed change value ΔV+ to obtain the autonomic speed VE+. After that, the calculation of autonomic speed is repeated based on the autonomic speed VE+. As a result, the degree of error of the autonomic speed VE+ will increase as time advances.

Similarly, the smaller initial speed Va− is added to the smaller speed change value ΔV− to obtain the autonomic speed VE−, whose value becomes smaller as Lime advances. As a result, both the difference between VE and VE+ and the difference between VE and VE− will increase as time advances.

By the way, as for the autonomic speed VE+, the distance Dm, calculated from the initial speed Va+, becomes larger and the denominator of the equation (2) becomes larger. On the other hand, as for the autonomic speed VE−, the numerator of the equation (2) becomes smaller. As a result, the error of the initial speed Va− affects the angle θ of the incline much more than the error of the initial speed Va+affects the angle θ of the incline. Accordingly, the degree of error of the autonomic speed VE when the initial speed Va includes a minus error becomes larger than when the initial speed Va includes a plus error.

As shown in FIG. 4B, in a similar way to that of the horizontal surface, the travel distance DT, calculated from the precise autonomic speed VE, increases in proportion to the value of the autonomic speed VE as time advances.

On the other hand, the error of the autonomic speed VE+ and VE− (FIG. 3B) will increase as time advances. Accordingly, the error of the travel distance DT+ and DT− (FIG. 4B) calculated from the autonomic speed VE+ and VE− will also increase in geometric progression.

On the other hand, as shown in FIG. 6A, in a case in which the angle of the descending slope becomes steeper as the vehicle 100 moves on the road, the distance Dm is precisely calculated if the initial speed Va does not include an error (which is similar to that of the ascending slope). Accordingly, the gravity acceleration component gf, which corresponds to the precise angle θ of the incline, is subtracted from the detection acceleration αG. Moreover, based on the precise speed change value ΔV (ΔV=αP×mt), the precise speed V1 can be calculated. By the way, when the vehicle is running on the descending slope, the acceleration in the opposite direction is applied to the vehicle due to the vehicle acceleration αP and the gravity acceleration gf. As a result, the vehicle acceleration αP becomes larger than the detection acceleration αG.

On the other hand, as shown in FIG. 6B, if the initial speed is "Va+" with plus error (i.e. faster than the initial speed Va), the calculated distance Dm is larger than the actual distance Dm. Accordingly, like the above case in which the vehicle is running on the ascending slope, the angle "θ−" of the incline becomes less steep than the actual. In addition, the gravity acceleration component "gf−" becomes smaller than the actual gravity acceleration component gf.

When the vehicle is running on the descending slope, the sign of the gravity acceleration component gf− is opposite to that of the detection acceleration αG. Accordingly, subtracting the gravity acceleration component gf− from the detection acceleration αG presents the vehicle acceleration "αP−" which is smaller than the actual. Based on the vehicle acceleration αP−, the speed change value becomes "ΔV−" which is smaller than the actual speed change value ΔV. This speed change value becomes ΔV− is added to the larger initial speed Va+ to obtain the autonomic speed VE+ whose error becomes, unlike the above case of the ascending slope, smaller than that of the initial speed Va+.

In addition, as shown in FIG. 6C, if the initial speed is "Va−" with minus error (i.e. slower than the actual speed Va), the calculated distance "Dm−" is smaller than the actual. Accordingly, the angle θ of the incline becomes larger than the actual, like the above case of the ascending slope. Accordingly, the calculated gravity acceleration component "gf+" is larger than the actual gravity acceleration component gf.

In this case, like the above case of the initial speed Va+, the sign of the gravity acceleration component gf+ is opposite to that of the detection acceleration αG. Accordingly, subtracting the gravity acceleration component gf+ from the detection acceleration αG presents the vehicle acceleration "αP+" which is larger than the actual. Based on the vehicle acceleration αP+, the speed change value becomes "ΔV+" which is larger than the actual speed change value ΔV. This speed change value becomes ΔV+ is added to the smaller initial speed Va− to obtain the autonomic speed VE− whose error becomes, unlike the above case of the ascending slope, smaller than that of the initial speed Va−.

In that manner, when the vehicle 100 is running on the descending slope at constant speed, as shown in FIG. 3C, the larger initial Va+ is added to the smaller speed change value ΔV− to obtain the autonomic speed VE+. After that, the calculation of autonomic speed is repeated based on the autonomic speed VE+. Accordingly, the autonomic speed VE+will become smaller as time advances.

Similarly, the smaller initial speed Va− is added to the larger speed change value ΔV+ to obtain the autonomic speed VE−, which will increase as time advances. As a result, both the difference between VE and VE+ and the difference between VE and VE− will become smaller as time advances.

In this case, as shown in FIG. 4C, like the above case of the horizontal surface and the ascending slope, the travel distance DT, calculated from the precise autonomic speed VE, will increase in proportion to the autonomic speed VE as time advances.

On the other hand, the error of the autonomic speed VE+ and VE− (FIG. 3C) will decrease as time advances. Therefore, the error of the travel distance DT+ and DT− (FIG. 4C) will decrease during the early time period. However, as the error of the autonomic speed VE+ and VE− decrease, the error of the travel distance DT+ and DT− get well controlled. As a result, the autonomic speed VE+ and VE− becomes substantially the same level as the autonomic speed VE. After that, the error of travel distance DT+ and DT− will no longer increase, having the same slope as that of the travel distance DT.

In that manner, if the initial speed Va includes an error, the degree of error of the calculated autonomic speed VE is associated with the angle of the slope. In addition, the degree of error of the travel distance is determined based on the autonomic speed VE.

In addition, unlike the autonomic speed VE, once an error occurs in the travel distance DT, the error is not eliminated. The error of the travel distance DT will increase as time advances except the case in which the vehicle is running on a long descending road. Accordingly, the reliability of the calculated travel distance DT may not be able to be determined based on the autonomic speed VE. Therefore, the reliability of the calculated travel distance DT is determined from the travel distance DT.

According to an embodiment of the present invention, the error range of the initial speed Va is estimated. In accordance with the same calculation method of the autonomic speed VE, the error range of the autonomic speed VE, which is associated with the angle of the slope, is calculated by using the error range of the initial speed Va. Based on the error range of the autonomic speed VE, the error range of the travel distance DT is calculated. Based on the error range of the travel distance DT, the reliability of the travel distance DT is evaluated. The method of evaluating the reliability will be described below.

(3) Reliability Evaluation of Travel Distance

When the navigation apparatus 1 detects that it is not receiving the GPS signals, the arithmetic processing block 10 regards the last GPS speed VGa, which was calculated immediately before the apparatus 1 lost the connection with the GPS satellite, as the initial speed Va and calculates the autonomic speed VE.

The autonomic speed calculation section 14 of the arithmetic processing block 10 calculates, in accordance with the equation (7), the autonomic speed VE (or the speed V1) by using the detection acceleration $\alpha G$ and height change Dh which are updated every second for example. In this case, when one second has passed since the apparatus 1 detected that it was not receiving the GPS signals, the autonomic speed calculation section 14 regards the last GPS speed VGa as the speed V0 of the time instance t0. After two seconds have passed since the apparatus 1 detected that it was not receiving the GPS signals, the autonomic speed calculation section 14 regards the previously-calculated autonomic speed VE as the speed V0 to calculate, as the autonomic speed VE, the current autonomic speed V1 (of the time instant t1).

The travel distance calculation section 15 of the arithmetic processing block 10 continuously multiplies the autonomic speed VE by the measurement time (for example, 1 second) and then adds them up to calculate the travel distance DT or a distance the vehicle 100 has traveled since the apparatus 1 detected that it was not receiving the GPS signals.

Moreover, a reliability evaluation section 20 of the arithmetic processing section 10 performs a reliability evaluation process to evaluate the reliability of the travel distance DT.

The arithmetic processing block 10 stores in the storage section 19 an autonomic position update table. This update table is set as "valid" or "invalid" indicating whether the autonomic position is appropriately updated. Only when the update table is set as "valid", the arithmetic processing block 10 starts the reliability evaluation process. When the apparatus 1 detects that it is not receiving the GPS signals (i.e. when the initial speed Va is set), the arithmetic processing block 10 puts a flag in a column of the autonomic speed update table to indicate validity.

It is known that the GPS speed data VG, calculated from the GPS signals, may include a certain degree of error due to the reception condition of the GPS signals. The error range of the GPS speed VG (or a range that may include the actual speed of the vehicle 100) can be estimated from the DOP value.

The storage section 19 stores an error table in which the values of estimated speed error of the GPS speed VG is associated with the DOP values. For example, a certain DOP value is associated with the estimated speed error data of "±0.2 [m/s]" which is an estimated range of the speed error.

An error speed calculation section 17 acquires from the storage section 19 a DOP value corresponding to the last GPS speed VGa in the table and then reads out from the error table the estimated speed error data that is associated with the DOP value in the table. The error speed calculation section 17 subsequently adds the value of the estimated speed error data to the last GPS speed VGa to calculate, as the maximum and minimum speed of the error range, a maximum GPS speed VGa+ and a minimum GPS speed VGa−, respectively.

The error speed calculation section 17 regards the maximum GPS speed VGa+ and the minimum GPS speed VGa− as the initial speed Va+ and Va−, respectively. The error speed calculation section 17 subsequently calculates the speed V1 based on the equation (7). In this manner, the error speed calculation section 17 calculates the maximum and minimum of the error range of the autonomic speed VE as a maximum autonomic speed $VE_{MAX}$ and a minimum autonomic speed $VE_{MIN}$, respectively.

In addition, in a similar way to that of the travel distance calculation section 15, an error travel distance calculation section 18 calculates, based on the maximum autonomic speed $VE_{MAX}$ and the minimum autonomic speed $VE_{MIN}$, the maximum and minimum of the error range of the travel distance DT as a maximum travel distance $DT_{MAX}$ and a minimum travel distance $DT_{MIN}$, respectively.

By the way, in the subsequent calculation process, the arithmetic processing block 10 calculates, based on the previously-calculated maximum autonomic speed $VE_{MAX}$ and the minimum autonomic speed $VE_{MIN}$, the current maximum autonomic speed $VE_{MAX}$ and the minimum autonomic speed $VE_{MIN}$, by using the same method as calculating the speed V1 based on the equation (7) with the speed V0.

Figure 7:
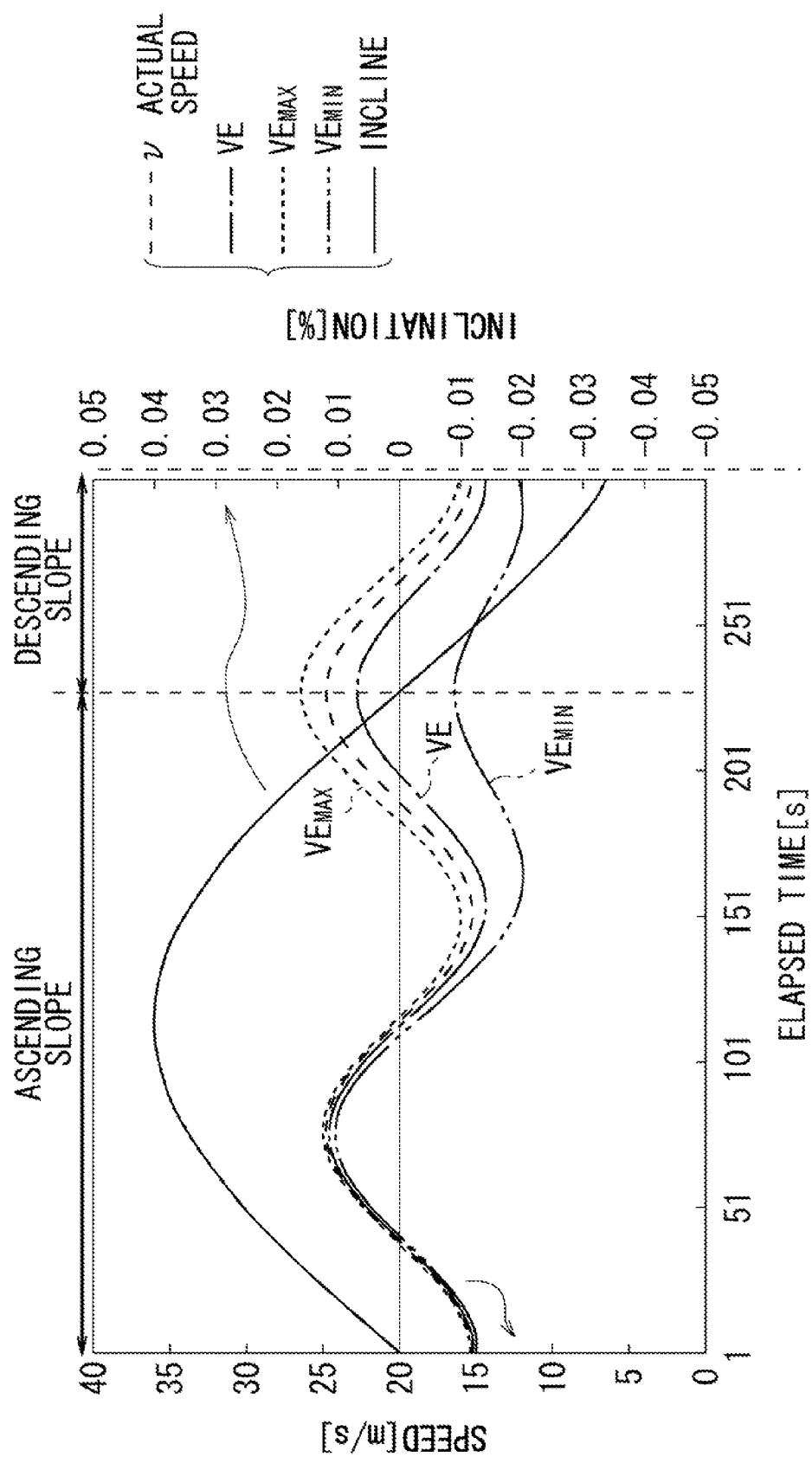
FIG. 7 is a schematic diagram illustrating an error range and an autonomic speed.
Figure 8:
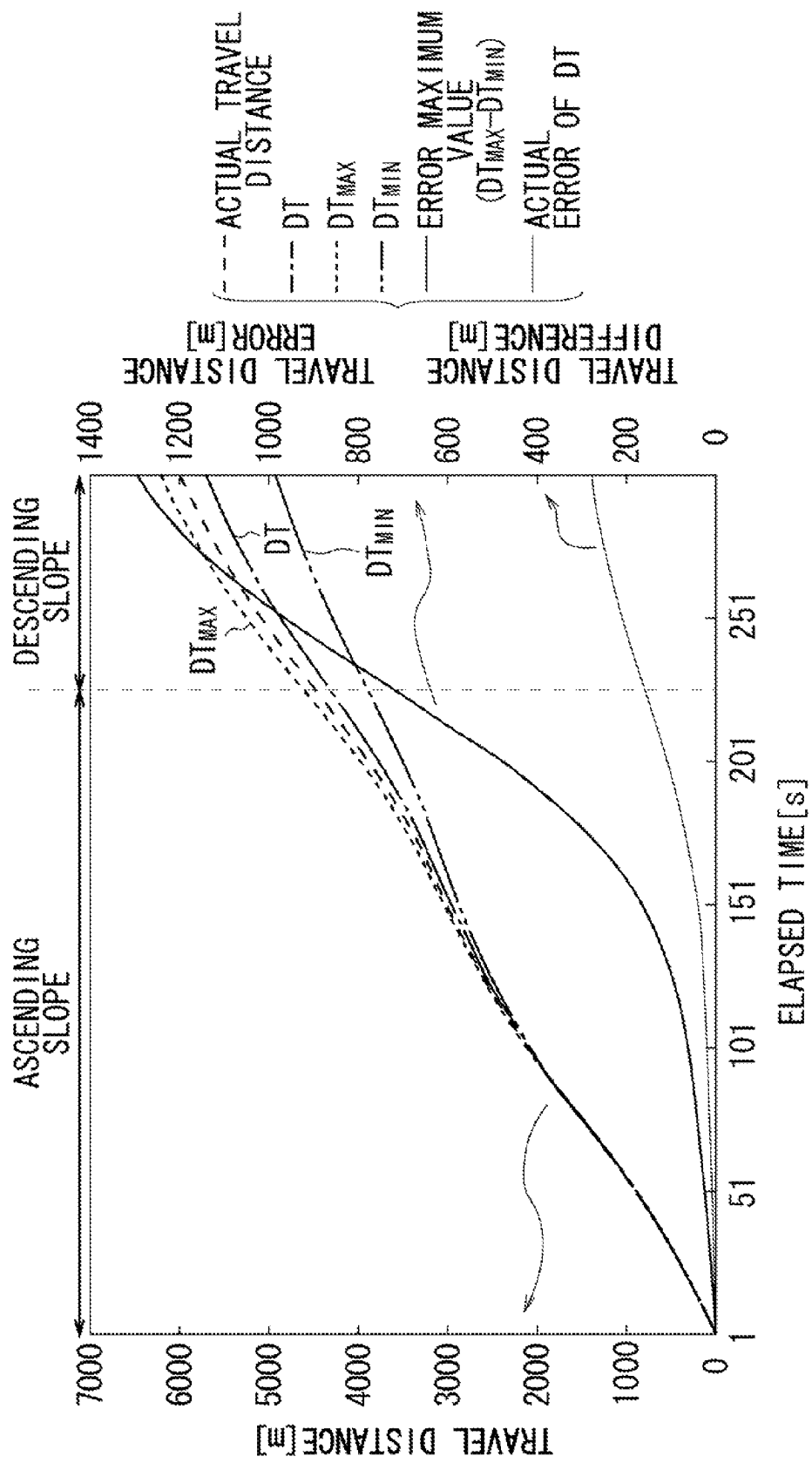
FIG. 8 is a schematic diagram illustrating an error range and an autonomic speed.

FIGS. 7 and 8 illustrate the autonomic speed VE and travel distance DT calculated under the condition that the vehicle 100 is running on the incline. Those graphs show the maximum autonomic speed $VE_{MAX}$ and the minimum autonomic speed $VE_{MIN}$: The vehicle 100 has run up the ascending slope during a period of time from 1 to 230 seconds and then run down the descending slope. In this case, the estimated speed error of the last GPS speed VGa (not shown) is ±0.2 m/s. In addition, suppose that, compared to the actual speed v, the last GPS speed VGa (not shown) has an error of −0.1 m/s. By the way, in FIG. 7, if the rate of inclination is plus, then it means the road is an ascending slope. Whereas if the rate of inclination is minus, then it means that the road is a descending slope.

As shown in FIG. 7, when the vehicle is running on the ascending slope, both a difference between VE and $VE_{MAX}$ and a difference between VE and $VE_{MIN}$ gradually increase. A difference between $VE_{MAX}$ and $VE_{MIN}$ will also increase. When the vehicle is running on the descending slope, both a difference between VE and $VE_{MAX}$ and a difference between VE and $VE_{MIN}$ gradually decrease. The difference between $VE_{MAX}$ and $VE_{MIN}$ will also decrease. By the way, due to the error of the initial speed Va, the autonomic speed VE is slower than the actual speed v.

As shown in FIG. 8, when the vehicle is running on the ascending slope the difference between $VE_{MAX}$ and $VE_{MIN}$ increases. Accordingly, an error maximum value (indicated by solid lines), indicating a difference between $VE_{MAX}$ and $VE_{MIN}$, will increase in geometric progression.

On the other hand, when the vehicle is running on the descending slope, the error maximum value will increase due to the increasing difference between $VE_{MAX}$ and $VE_{MIN}$. However, as the difference between $VE_{MAX}$ and $VE_{MIN}$ decreases, the slope of the error maximum value becomes gentle. By the way, the actual error of the travel distance DT (or a difference between the actual travel distance and the calculated travel distance DT) does not exceed the error maximum value, being much smaller than the error maximum value.

The reliability evaluation section 20 of the arithmetic processing block 10 evaluates the reliability of the travel distance DT. That is, the arithmetic processing block 10 checks if the calculated travel distance DT is reliable.

Specifically, the reliability evaluation section 20 subtracts the minimum travel distance $DT_{MIN}$ from the maximum travel distance $DT_{MAX}$ to calculate a maximum error value indicating the error range of the travel distance DT, and then checks if the maximum error value is less than a predetermined reliability threshold.

If the maximum error value is less than the reliability threshold, the reliability evaluation section 20 determines that the travel distance DT is reliable data. Whereas if the maximum error value is greater or equal to the reliability threshold, the reliability evaluation section 20 determines that the travel distance DT is not reliable data.

When the reliability evaluation section 20 determines that the travel distance DT is reliable data, the travel distance calculation section 15 of the arithmetic processing block 10 generates, based on the travel distance data DT, the autonomic position signal PE, which is then supplied to the navigation unit 6 along with the autonomic speed data VE. The display section 3 therefore displays the autonomic position and speed VE of the vehicle 100.

If the vehicle often runs down the descending slopes while not receiving GPS signals, the error of the travel distance DT gradually increases. In this case, the navigation apparatus 1 continuously displays on the display section 3 the vehicle's current position that has been confirmed as reliable data. This allows the navigation apparatus 1 to continuously display the current position of the vehicle 100 for a long time.

When the reliability evaluation section 20 determines that the travel distance DT is not reliable data the arithmetic processing block 10 stops supplying the autonomic speed data VE and the autonomic position signal PE to the navigation unit 6. In addition, the arithmetic processing block 10 supplies to the navigation unit 6 a update invalidity notification signal notifying the navigation unit 6 of the fact that the supply of the autonomic speed data VE and autonomic position signal PE is stopped until the apparatus begins to receive the GPS signals again. As a result, the display section 3 stops displaying the autonomic position and autonomic speed VE of the vehicle 100.

In that manner, immediately after it determines that the travel distance DT is not reliable, the navigation apparatus 1 stops displaying the autonomic position of the vehicle 100 because it is unreliable.

In addition, when it determines that the travel distance DT is not reliable, the arithmetic processing block 10 puts a flag in the column of the autonomic position update table stored in the storage section 19 to indicate invalidity for the update of the autonomic position.

Accordingly, once it determines that the travel distance DT is unreliable, the arithmetic processing block 10 stops performing the reliability evaluation process until the apparatus begins to receive the GPS signals again.

In that manner, the navigation apparatus 1 recognizes the maximum and minimum of the error range of the last GPS speed VGa (which is to be set as the initial speed Va) as the maximum GPS speed VGa+ and the minimum GPS speed VGa−. The navigation apparatus 1 then recognizes the maximum GPS speed VGa+ and the minimum GPS speed VGa− as the initial speed Va+ and Va− to calculate the maximum autonomic speed $VE_{MAX}$ and the minimum autonomic speed $VE_{MIN}$. The navigation apparatus 1 therefore calculates the error range of the autonomic speed VE, which arises from the error of the initial speed Va. Moreover, the navigation apparatus 1 calculates the maximum and minimum of the error range of the travel distance DT as the maximum travel distance $DT_{MAX}$ and the minimum travel distance $DT_{MIN}$, based on the maximum autonomic speed $VE_{MAX}$ and the minimum autonomic speed $VE_{MIN}$. In addition, the navigation apparatus 1 determines that the travel distance DT is unreliable data when the error maximum value indicating the error range of the travel distance DT exceeds the threshold.

In that manner, the navigation apparatus 1 can calculate the error range of the travel distance DT and this error range changes according to the angle of the incline and the error range of the GPS speed VG (which is to be set as the initial speed Va). Based on the error range of the travel distance DT, the navigation apparatus 1 can check if the travel distance data DT is reliable.

(4) Reliability Evaluation Process

Figure 9:
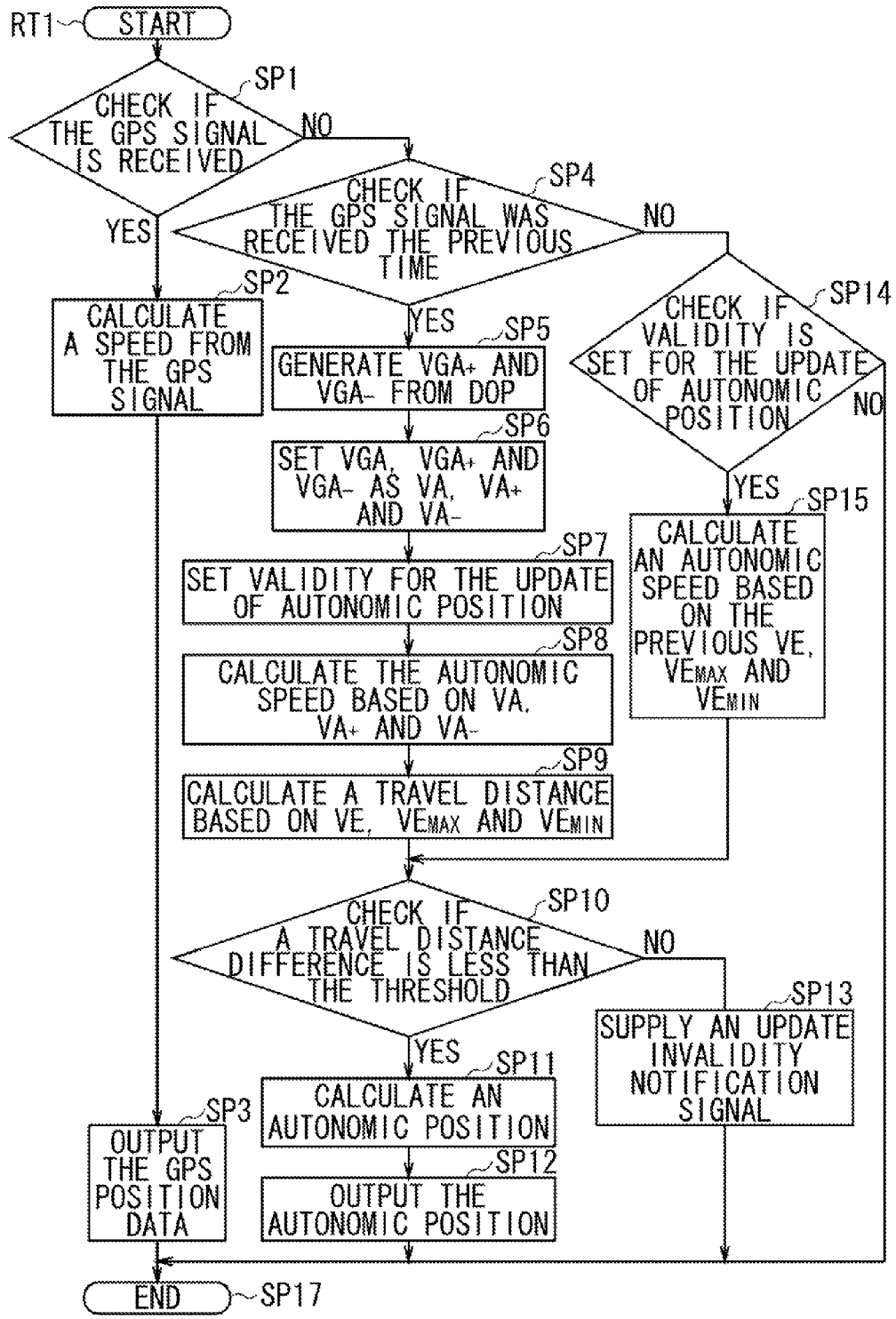
FIG. 9 is a flowchart illustrating a procedure of a reliability evaluation process.

FIG. 9 is a flowchart illustrating a procedure RT1 of the reliability evaluation process. The apparatus executes the reliability evaluation program to perform the procedure RT1 at predetermined intervals (for example 1 second).

The navigation apparatus 1 starts the procedure RT1 of the reliability evaluation process from start step and then proceeds to step SP1. At step SP1, the navigation apparatus 1 check if it has received the GPS signals during the input period.

If the navigation apparatus 1 determines that it has received the GPS signals during the input period, then this means that the navigation apparatus 1 can calculate, based on the received GPS signals, the current position of the vehicle as the GPS position. In this case, the navigation apparatus 1 proceeds to step SP2.

At step SP2, the navigation apparatus 1 calculates the GPS speed VG and DOP value from the GPS signals and then stores the calculated GPS speed data VG and DOP value in the storage section 19. The navigation apparatus 1 subsequently proceeds to step SP3.

At step SP3, the navigation apparatus 1 generates the position signal PS from the GPS signals and then controls the display section 3 to display information, such as the GPS position, based on the position signal PS and the like. The navigation apparatus 1 subsequently proceeds to step SP17 to end the process.

Whereas if the navigation apparatus 1 at step SP1 determines that it has not received the GPS signals during the input period, then this means that the navigation apparatus 1 may not be able to calculate the position signal PS due to the lack of the GPS signals and therefore has to operate in the autonomic mode. In this case, the navigation apparatus 1 proceeds to step SP4.

At step SP4, the navigation apparatus 1 check if it had received the GPS signals during the previous input period.

If the navigation apparatus 1 determines that it had received the GPS signals during the previous input period, then this means that the navigation apparatus 1 has not set the initial speed Va yet to calculate the autonomic speed VE by using the equation (7). In this case, the navigation apparatus 1 proceeds to step SP5.

At step SP5, based on the DOP value calculated from the GPS signals, the navigation apparatus 1 calculate the error range of the last GPS speed VGa, or the maximum GPS speed VGa+ and the minimum GPS speed VGa−. The navigation apparatus 1 subsequently proceeds to step SP6.

At step SP6, the navigation apparatus 1 sets the last GPS speed VGa, the maximum GPS speed VGa+ and the minimum GPS speed VGa− as the initial speed Va, Va+ and Va−, respectively. The navigation apparatus 1 subsequently proceeds to step SP7.

At step SP7, the navigation apparatus 1 sets "valid" for the update of the autonomic position, and then proceeds to step SP8.

At step SP8, based on the initial speed Va, Va+ and Va− set at step SP6, the navigation apparatus 1 calculates the autonomic speed VE, the maximum autonomic speed $VE_{MAX}$ and the minimum autonomic speed $VE_{MIN}$, and then proceeds to step SP9.

At step SP9, based on the autonomic speed VE, the maximum autonomic speed $VE_{MAX}$ and the minimum autonomic speed $VE_{MIN}$, the navigation apparatus 1 calculate the travel distance DT, the maximum travel distance $DT_{MAX}$ and the minimum travel distance $DT_{MIN}$, and then proceeds to step SP10.

At step SP10, the navigation apparatus 1 subtracts the minimum travel distance $DT_{MIN}$ from the maximum travel distance $DT_{MAX}$ to calculate the error maximum value indicating the error range of the travel distance DT, and then checks if the error maximum value is less than the reliability threshold.

If it determines that the error maximum value is less than the reliability threshold, then this means that the travel distance DT is reliable data. In this case, the navigation apparatus 1 proceeds to step SP11. At step SP11, the navigation apparatus 1 calculates the autonomic position based on the travel distance data DT, and then proceeds to step SP12.

At step SP12, the navigation apparatus 1 controls the display section 3 to display information such as the autonomic position and speed VE of the vehicle 100 and the like, and then proceeds to step SP17 to end the process.

Whereas if the navigation apparatus 1 at step SP10 determines that the error maximum value is greater or equal to the reliability threshold, then this means that the travel distance DT is not reliable data. In this case, the navigation apparatus 1 proceeds to step SP13.

At step SP13, the navigation apparatus 1 set "invalid" for the update of the autonomic position and also supplies the update invalidity notification signal to the navigation unit 6. The navigation apparatus 1 subsequently proceeds to step SP17 to end the process.

If the navigation apparatus 1 at step SP4 determines that it had not received the GPS signals during the previous input period, then this means that the navigation apparatus 1 has already set the initial speed Va, Va+ and Va− during the previous process of step SP6. In this case, the navigation apparatus 1 proceeds to step SP14.

At step SP14, the navigation apparatus 1 check if a flag of "valid" has been set for the update of the autonomic position.

If the navigation apparatus 1 determines that a flag of "valid" has been set for the update of the autonomic position, then this means the previously-calculated travel distance data DT is still reliable. In this case, the navigation apparatus 1 proceeds to step SP15.

At step SP15, based on the previously calculated autonomic speed VE, maximum autonomic speed $VE_{MAX}$ and minimum autonomic speed $VE_{MIN}$, the navigation apparatus 1 calculates the current autonomic speed VE, maximum autonomic speed $VE_{MAX}$ and minimum autonomic speed $VE_{MIN}$, and then proceeds to step SP9 to calculate the travel distance DT.

Whereas if the navigation apparatus 1 at step SP14 determines that a flag of "valid" has not been set, then this means that the calculation of the travel distance DT is stopped because the previous process of step SP10 determined that the travel distance DT was not reliable. In this case, the navigation apparatus 1 proceeds to step SP17 to end the process.

(5) Operation and Effect

When the navigation apparatus 1 mounted on the vehicle 1 is unable to receive the GPS signals after a period of time during which it was receiving the GPS signals, the navigation apparatus 1 regards the last GPS speed VGa (a speed of the vehicle 100 at the time when the apparatus 1 received the last GPS signal) as the initial speed Va and then calculates the current speed of the vehicle 100 as the autonomic speed VE by using a predetermined calculation method or the equation (7). The navigation apparatus 1 also calculates the travel distance DT or a distance the vehicle 100 has traveled since the navigation apparatus 1 stopped receiving the GPS signals. In this case, the navigation apparatus 1 uses the maximum GPS speed VGa+ and minimum GPS speed VGa−, which represent the initial speed error range of the last GPS speed VGa, to calculate by using the equation (7) the maximum autonomic speed $VE_{MAX}$ and minimum autonomic speed $VE_{MIN}$, which indicate the current speed error range of the autonomic speed VE. Based on the maximum autonomic speed $VE_{MAX}$ and the minimum autonomic speed $VE_{MIN}$, the navigation apparatus 1 calculates the maximum travel distance $DT_{MAX}$ and minimum travel distance $DT_{MIN}$, which indicate the travel distance error range of the travel distance DT. Based on the maximum travel distance $DT_{MAX}$ and the minimum travel distance $DT_{MIN}$, the navigation apparatus 1 check if the travel distance DT is reliable data. As the result of checking, the navigation apparatus 1 performs an appropriate process.

Accordingly, the data of the maximum autonomic speed $VE_{MAX}$ and minimum autonomic speed $VE_{MIN}$ reflect the possible maximum error of the autonomic speed VE (The error of the autonomic speed VE arising from the error of the last GPS speed VGa can be estimated based on the equation (7)). In addition, the data of the maximum travel distance $DT_{MAX}$ and minimum travel distance $DT_{MIN}$, calculated based on the maximum autonomic speed $VE_{MAX}$ and the minimum autonomic speed $VE_{MIN}$, reflect the possible maximum error of the travel distance DT. Accordingly, based on the maximum travel distance $DT_{MAX}$ indicating that error range, the reliability of the travel distance DT can be evaluated. The navigation apparatus 1 therefore can provide the users with reliable data.

As for the calculation method of the autonomic speed VE that is calculated by using the equation (7), since the newly-arising errors of the autonomic speed VE may be attributed to the error of the last GPS speed VGa, the navigation apparatus 1 assumes that the error range of the last GPS speed VGa can be represented as the maximum GPS speed VGa+. Based on the maximum GPS speed VGa+, the navigation apparatus 1 can easily calculate the maximum autonomic speed $VE_{MAX}$ or the maximum of the error range of the autonomic speed VE.

Moreover, besides the maximum autonomic speed $VE_{MAX}$ or the maximum of the error range of the autonomic speed VE, the navigation apparatus 1 calculates the minimum autonomic speed $VE_{MIN}$ or the minimum of the error range of the autonomic speed VE. Furthermore, the navigation apparatus 1 calculates the maximum and minimum of the error range of the travel distance DT as the maximum travel distance $DT_{MAX}$ and the minimum travel distance $DT_{MIN}$.

As noted above, the autonomic speed VE may include plus and minus errors: The error range of the autonomic speed VE may not be precisely calculated, for example, by doubling the difference between the maximum of the error range and the autonomic speed VE. Accordingly, in this embodiment, the navigation apparatus 1 calculates the error ranges of the autonomic speed VE and travel distance DT with both the maximum and minimum values. Accordingly, the navigation apparatus 1 can precisely calculate the error range of the travel distance DT, resulting in improvement in accuracy of the reliability evaluation.

Furthermore, if the navigation apparatus 1 determines that the travel distance DT is reliable data, the display section 3 displays the autonomic position, which is the estimated current position of the vehicle 100 (estimated based on the travel distance DT). Whereas if it determines that the travel distance DT is unreliable data, the display section 3 does not display the autonomic position.

In that manner, the navigation apparatus 1 continues to display the reliable autonomic position data until it is determined as unreliable data. Therefore, the user is provided with reliable information for a long time.

Furthermore, the navigation apparatus 1 calculates the maximum GPS speed VGa+based on the DOP value calculated from the GPS signals which were received by the GPS antenna 5 or a GPS receiving apparatus.

Accordingly, the navigation apparatus 1 sets the value of the maximum GPS speed VGa in accordance with the reliability of the GPS speed VG calculated from the GPS signals. Therefore, the navigation apparatus 1 can evaluate the reliability of the travel distance DT more accurately than when the value of the maximum GPS speed VGa is determined based on the maximum error of the GPS speed VG.

According to the above configuration, when calculating the autonomic speed VE based on the predetermined calculation method, the navigation apparatus 1 calculates, based on that calculation method, the error range of the autonomic speed VE by using the error range of the initial speed Va. Accordingly, the error range of the autonomic speed VE reflects characteristic of that calculation method. Thus, the navigation apparatus 1 can precisely calculate the error range of the autonomic speed. Moreover, the navigation apparatus 1 calculate, based on the error range of the autonomic speed VE, the error range of the travel distance DT. Based on the error range of the travel distance DT, the navigation apparatus 1 evaluates the reliability of the travel distance DT. Based on the reliable travel distance DT, the current position of the vehicle 100 is calculated. Therefore, the navigation apparatus 1 can precisely evaluates the reliability of the travel distance DT. Thus, the navigation apparatus and navigation processing method according to an embodiment of the present invention can provide reliable position information.

(6) Other Embodiment

In the above-noted embodiment, when it determines that the travel distance DT is unreliable data, the navigation apparatus 1 stops displaying on the display section 3 the autonomic position of the vehicle 100. However, the present invention is not limited to this. The navigation apparatus 1 may keep displaying the autonomic position of the vehicle 100 along with a message indicating that the displayed position is unreliable.

Moreover, in the above-noted embodiment, the error range of the autonomic speed VE is calculated by using the equation (7). However, the present invention is not limited to this. The error range may reflect other types of error: For example, besides the effect of the equation (7), the error range may automatically increase as time advances. In that manner, the equation (7) allows the navigation apparatus 1 to precisely evaluate the reliability of the travel distance DT.

Furthermore, in the above-noted embodiment, the autonomic speed VE is calculated based on the equation (7) from the height change and the acceleration. However, the present invention is not limited to this. Other methods may be used to calculate the autonomic speed VE. In any case, the navigation apparatus 1 can precisely calculate the error range of the autonomic speed VE based on the applied calculation method of the autonomic speed VE.

Furthermore, in the above-noted embodiment, the navigation apparatus 1 calculates, as the error range of the autonomic speed VE, the maximum autonomic speed $VE_{MAX}$ and the minimum autonomic speed $VE_{MIN}$ and also calculates, as the error range of the travel distance DT, the maximum travel distance $DT_{MAX}$ and the minimum travel distance $DT_{MIN}$. However, the present invention is not limited to this. Alternatively, the navigation apparatus 1 may only calculate one of them (for example the maximum autonomic speed $VE_{MAX}$) as the error range of the autonomic speed VE, and then also calculate one of them (for example the maximum travel distance $DT_{MAX}$) as the error range of the travel distance DT. In this case, the navigation apparatus 1 check if a difference between the travel distance DT and the error range of the travel distance DT (i.e. the maximum travel distance $DT_{MAX}$) is less than a predetermined reliability threshold to evaluate the reliability.

Furthermore, in the above-noted embodiment, the error range of the last GPS speed VGa is calculated from the DOP value. However, the present invention is not limited to this. Alternatively, an estimated speed error, whose value varies according to the last GPS speed VGa, may be added to the last GPS speed VGa. This can present the same effect as the above method.

Furthermore, in the above-noted embodiment, the reliability evaluation program, or a navigation processing program, has been previously stored in the ROM. However, the present invention is not limited to this. The program may be installed in the storage section 19 or the ROM from external media such as "MEMORY STICK (Registered Trademark of Sony Corporation)". Alternatively, the reliability evaluation program and other programs may be acquired via Universal Serial Bus, "Ethernet (Registered Trademark)", IEEE (Institute of Electrical or Electronics Engineers) 802.11a/b/g and other wireless communication means, or through the terrestrial digital media broadcasting or the BS digital broadcasting.

Furthermore, in the above-noted embodiment, the GPS processing section 4 generates the position signal PS based on the GPS signals received through the GPS antenna 5. However, the present invention is not limited to this. Alternatively, the GPS processing section 4 may generate the position signal PS by using other satellite positioning system such as the quasi-zenith satellite system, Global Navigation Satellite System (GLONASS) or GALILEO.

Furthermore, the method according to the embodiments of the present invention is applied to the navigation apparatus 1 mounted on the vehicle 100. However, the present invention is not limited to this. The method may be also applied to other electronic devices that do not use the vehicle's speed pulse signal or the like, such as mobile phones, personal computers or PDA with GPS system. The navigation apparatus 100 may be also mounted on ships, planes or the like.

Furthermore, in the above-noted embodiment, the navigation apparatus 1 includes the GPS speed calculation section 13, which is equivalent to a speed calculation section; the travel distance calculation section 15, which is equivalent to a travel distance calculation section; the error speed calculation section 17, which is equivalent to a speed error range calculation section; the error travel distance calculation section 18, which is equivalent to a travel distance error range calculation section; the reliability evaluation section 20, which is equivalent to a reliability evaluation section; and the navigation unit 6, which is equivalent to a control section. However, the present invention is not limited to this. The navigation apparatus may be configured in a different manner, while including the speed calculation section, the travel distance calculation section, the speed error range calculation section, the travel distance error range calculation section, the reliability evaluation section and the control section.

The method according to an embodiment of the present invention can be applied to various navigation apparatus mounted on a vehicle, an airplane or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus comprising:
a speed calculation section that calculates, in accordance with a predetermined calculation method, a current speed of a mobile object at predetermined intervals, based oil the mobile object's initial speed detected at the start of the calculation;
a travel distance calculation section that calculates a travel distance the mobile object has traveled so far since the start of the calculation, by using the current speed;
a current speed error range calculation section that calculates, based on the calculation method, a current speed error range of the current speed by using an initial speed error range of the initial speed;
a distance error range calculation section that calculates a travel distance error range of the travel distance by using the current speed error range;
a reliability evaluation section that evaluates, based on the travel distance error range, the reliability of the travel distance; and
a control section that performs a navigation process corresponding to the reliability of the travel distance.

2. The navigation apparatus according to claim 1, wherein the control section displays on a display section the current position information calculated from the travel distance if the reliability evaluation section determines that the travel distance is reliable while not displaying the current position information if the reliability evaluation section determines that the travel distance is unreliable, to display only the reliable current position information on the display section.

3. The navigation apparatus according to claim 1, wherein the current speed error range calculation section calculates the current speed error range by using the same calculation method as the speed calculation section.

4. The navigation apparatus according to claim 1, wherein the speed calculation section calculates the current speed based on an acceleration and height change of the mobile object.

5. The navigation apparatus according to claim 1, wherein:
the initial speed error range is represented by a maximum initial speed and a minimum initial speed; and
the current speed error range calculation section calculates the current speed error range based on a maximum speed and a minimum speed.

6. The navigation apparatus according to claim 1, wherein the error range of the initial speed is calculated based on Dilution of Precision (DOP) calculated from a Global Positioning System (GPS) signal received through a GPS receiving apparatus.

7. A navigation processing method comprising:
a speed calculation step cf calculating, in accordance with a predetermined calculation method, a current speed of a mobile object at predetermined intervals, based on the mobile object's initial speed detected at the start of the calculation;
a travel distance calculation step of calculating a travel distance the mobile object has traveled so far since the start of the calculation, by using the current speed;
a current speed error range calculation step of calculating, based on the calculation method, a current speed error range of the current speed by using an initial speed error range of the initial speed;
a distance error range calculation step of calculating a travel distance error range of the travel distance by using the current speed error range;
a reliability evaluation step of evaluating, based on the travel distance error range, the reliability of the travel distance; and
a control step of performing a navigation process corresponding to the reliability of the travel distance.

8. The navigation processing method according to claim 7, wherein
the control step displays on a display section the current position information calculated from the travel distance if the reliability evaluation step determines that the travel distance is reliable while not displaying the current position information if the reliability evaluation step determines that the travel distance is unreliable, to display only the reliable current position information on the display section.

9. The navigation processing method according to claim 7, wherein
the current speed error range calculation step calculates the current speed error range by using the same calculation method as the speed calculation step.

10. The navigation processing method according to claim 7, wherein
the speed calculation step calculates the current speed based on an acceleration and height change of the mobile object.

11. The navigation processing method according to claim 7, wherein:
the initial speed error range is represented by a maximum initial speed and a minimum initial speed; and
the current speed error range calculation step calculates the current speed error range based on a maximum speed and a minimum speed.

12. The navigation processing method according to claim 7, wherein
the error range of the initial speed is calculated based on Dilution of Precision (DOP) calculated from a Global Positioning System (GPS) signal received through a GPS receiving apparatus.

* * * * *